(12) United States Patent  (10) Patent No.: US 6,971,118 B1
Akhavan et al.  (45) Date of Patent: Nov. 29, 2005

(54) SYSTEM FOR DISPLAYING PROGRAMMING GUIDE INFORMATION

(75) Inventors: Mojgan J. Akhavan, Irvine, CA (US); Eugene P. Martinez, Jr., Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/363,073

(22) Filed: Jul. 28, 1999

(51) Int. Cl.[7] .......................... G06F 3/00; G06F 13/00; H04N 5/445
(52) U.S. Cl. .......................................... 725/43; 725/41
(58) Field of Search .............................. 725/43, 39, 38, 725/40, 44, 47, 52, 53, 56, 61; 348/906, 563, 348/564, 565; H04N 5/445; G06F 3/00, G06F 13/00

(56) References Cited

U.S. PATENT DOCUMENTS

| | | | |
|---|---|---|---|
| 5,161,019 A | | 11/1992 | Emanuel |
| 5,353,121 A | * | 10/1994 | Young et al. ................. 725/52 |
| 5,630,119 A | | 5/1997 | Aristides et al. |
| 5,635,978 A | | 6/1997 | Alten et al. |
| 5,727,060 A | | 3/1998 | Young |
| 5,801,747 A | * | 9/1998 | Bedard ........................ 725/46 |
| 5,822,123 A | * | 10/1998 | Davis et al. .................. 725/43 |
| 5,850,218 A | * | 12/1998 | Lajoie et al. ................. 725/45 |
| 5,880,768 A | * | 3/1999 | Lemmons et al. ............ 725/41 |
| 5,999,227 A | * | 12/1999 | Doherty et al. ............. 348/564 |
| 6,034,677 A | * | 3/2000 | Noguchi et al. ............ 345/327 |
| 6,052,145 A | * | 4/2000 | Macrae et al. .............. 348/906 |
| 6,064,376 A | * | 5/2000 | Berezowski et al. ........ 345/327 |
| 6,151,059 A | * | 11/2000 | Schein et al. ............... 345/327 |
| 6,266,814 B1 | * | 7/2001 | Lemmons et al. ............ 725/44 |

* cited by examiner

*Primary Examiner*—Vivek Srivastava
(74) *Attorney, Agent, or Firm*—Chernoff, Vilhauer, McClung & Stenzel

(57) ABSTRACT

A method is provided for displaying programming information. A video comprising a plurality of frames is displayed on a portion of a display. A first panel is displayed in response to a first signal from a user interface. The first panel is displayed on another portion of the display simultaneously with the video. The first panel contains information from at least one of a plurality of records, the records containing programming information, each of the records having an associated time and an associated channel, and the first panel having an associated time range and an associated range of channels. A new record is selected in response to a second signal from a user interface. A second panel is displayed simultaneously with the video, the second panel having an associated time range that is different than the associated time range of the first panel and the second panel having an associated range of channels that is the same as the associated range of channels of the first panel.

11 Claims, 10 Drawing Sheets

12:01:33PM   PG-13 (SAP) (CC)   8
04-08-98         90210
              11:30 - 12:00

Donna and Kelly seek revenge on David for calling Valerie a sad story. Brandon plans to move to New Jersey with his new girlfriend. His journalist instinct leads him to the trail of a mad man. Donna meets with her professor to discuss her acting abilities

SYSTEM FOR DISPLAYING PROGRAMMING GUIDE INFORMATION

BACKGROUND OF THE INVENTION

This invention relates to displaying electronic programming guide information on a video display, and more particularly to selecting and displaying records of electronic programming guide information having associated times that are different than the initially displayed records.

Electronic programming guides (EPGs) are well known and have been in use for several years. EPGs provide information to television viewers regarding television programming. EPGs typically display information on a video display, such as a television set. The information is characteristically provided in a grid form. Programming information is displayed with horizontal rows containing programs appearing on a particular channel and vertical columns being arranged according to time. An example of such an EPG grid is shown in Young, U.S. Pat. No. 5,727,060. The EPG grid generally is comprised of an array of irregular cells, where the cell size can vary from a fraction of an hour to many hours.

An EPG for a television system may be implemented in a variety of fashions. For example, one common implementation of an EPG utilizes a dedicated cable television channel for continuously broadcasting program schedule information. The television viewer tunes a cable converter box or television tuner to the channel on which the EPG information is modulated and views the program listings. Typically, the EPG utilizes a scrolling display of television listings. Some systems employ a partial screen of listings with additional information on the remainder of the screen such as advertisements for movies on pay channels, pay-per-view event schedules, time and weather information, and/or other commercial information.

There are several problems with the implementation of such an EPG system on a dedicated channel. First, the grid or matrix containing the EPG information must be viewed separately from the programming shown on other channels. Thus, viewers who wish to determine what is on different channels at different times must interrupt their viewing of a program to display the EPG grid. This interrupts the viewing of the program, and is an inconvenience for the viewer. Second, the amount of information displayed is extremely limited. The viewer can only see the programming information for the current time period. The viewer cannot control the display to view programming information at either earlier or later times. Finally, the viewer must wait for the display to scroll to the channels of interest. The relevant information is then only briefly displayed. This can be frustrating for the viewer who must wait for the display to scroll to the channels of interest.

One system has attempted to overcome this difficulty by providing a grid containing EPG information which overlays a video. In this system, a television displays a video simultaneously with a full EPG grid display. This is apparently accomplished by displaying the video on half of the pixels of the screen, and displaying the EPG grid on the other half of the pixels. This display is confusing for the viewer, since it is difficult to view either the video or the EPG grid. Moreover, this type of EPG grid display still does not allow the viewer to display programming information for times which are earlier or later than the displayed times.

Another type of information display involves the use of information banners. Information banners generally consist of a panel which contains more detailed programming guide information than contained in the EPG grid displays. The information banner is generally limited to a single program. The information banner may contain, for example, the channel, the time of the program, the title of the program, a short description of the program, whether the program is close-captioned, whether the program is a repeat, and the rating of the program. In one version of this system, an information banner is displayed at the bottom of the screen when a new channel is selected. The panel is then removed after a certain period of time if the channel is not changed.

In another system, a viewer may scroll through information banners while simultaneously viewing a video on the upper portion of the display. In this system, a viewer may scroll through the information banners for different channels to display information banners for programs showing at the current time. However, the viewer is unable to view information banners corresponding to different times. Thus, this system is limited to providing information relating to programming on other channels at the current time. If a viewer wishes to view programming guide information for different times, then the viewer must resort to interrupting his or her viewing by changing to an EPG grid display.

Thus, there exists a need for an improved display of EPG information. Such a system should allow a viewer to enjoy continuous uninterrupted viewing of a desired video, while at the same time allowing the viewer to peruse the EPG information for different times and for different channels. Further, the system should allow the viewer to conveniently switch back and forth between the information banner and the EPG grid, while nevertheless continuing the viewing enjoyment of the video.

BRIEF SUMMARY OF THE INVENTION

A first aspect of the present invention overcomes the drawbacks of the prior art by providing a method for displaying programming information. A video comprising a plurality of frames is displayed on a portion of a display. A first panel is then displayed in response to a first signal from a user interface. The first panel is displayed on another portion of the display simultaneously with the video. The first panel contains information from at least one of a plurality of records. The records contain programming information, each of the records having an associated time and an associated channel. The first panel has an associated time range and an associated range of channels. A record is selected in response to a second signal from the user interface. A second panel is then displayed simultaneously with the video. The second panel has an associated time range that is different than the associated time range of the first panel and the second panel has an associated range of channels that is the same as the range of channels of the first panel.

In one preferred method, the first and second panels are EPG grids each containing a plurality of cells. In another preferred method, the first and second panels are information banners.

In another aspect of the invention, a method is provided that is the same as the first aspect except the first panel is at least one of an EPG grid and an information banner and the second panel is an EPG grid when the first panel is an information banner and the second panel is an information banner when the first panel is an EPG grid. In this method, the associated range of channels of the first panel is different than the associated range of channels of the second panel.

The present invention has one or more advantages over the prior art. First, the present invention allows a viewer to simultaneously view a video while searching EPG information by time on the display. Thus, the present invention allows a viewer to view programming information on either EPG grids or information banners for earlier or later times than the current time period while continuing uninterrupted viewing of a video. The present invention also allows the viewer to conveniently switch back and forth between information banners and EPG grids.

The foregoing and other features and advantages of the invention will be more readily understood upon consideration of the following detailed description of the invention, taken in conjunction with the accompanying drawings.

BRIEF SUMMARY OF THE SEVERAL VIEWS OF THE DRAWINGS

FIG. 7A shows an exemplary information banner.

DETAILED DESCRIPTION OF THE PREFERRED EMBODIMENTS

Figure 1:
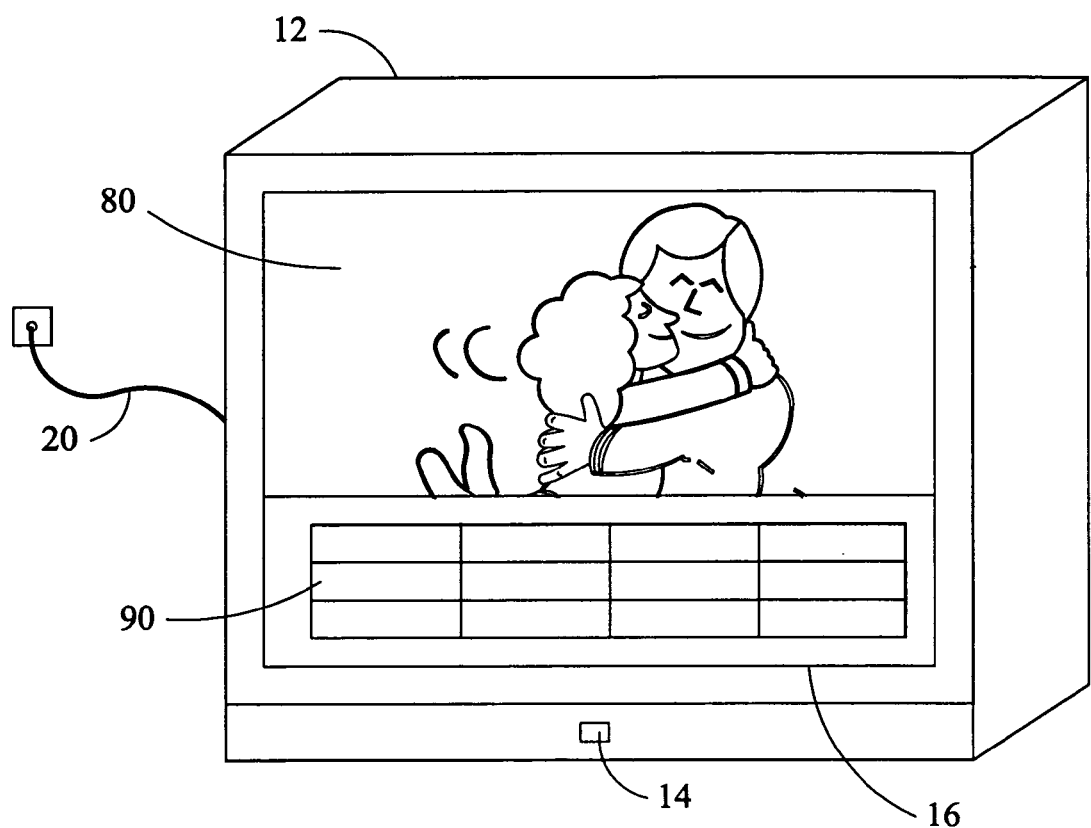
FIG. 1 shows a perspective view of an exemplary display and user interface of the present invention.
Figure 1:

Referring now to the figures, wherein like numerals refer to like elements, FIG. 1 shows schematically a system 10 having a display 12, a cable 20 and user interface 30. Display 12 is a device capable of displaying a video. As used herein, "video" generally means a plurality of frames which may be in any format, such as interlaced or progressive, and which may be analog or digital. The display may be a television, and is preferably a digital television. Alternatively, the display 12 could be a computer monitor, or any other device capable of displaying a video. In the system shown in 10, the video signals and EPG signals are preferably received via a cable 20. Cable 20 may receive signals from a satellite dish, cable system, a hard drive, a telephone line, a DVD, a CD-ROM, an antenna, the Internet, or any other type of system used for transmitting video and/or EPG signals.

In one preferred embodiment, a user interface 30 is provided which is a remote control unit for controlling the display 12. The user interface 30 sends signals to the display 12 using an infrared signal which is received at an infrared receiver 14 of the display 12. The display 12 has a screen 16 capable of displaying a video 80 from the video signals received from the cable 20. Alternatively, user interface 30 may be a keyboard and could be connected to display 12 using an electrical cable, or user interface 30 could send signals to display 12 using sound waves, radio transmission, a touch screen display 12, or any other suitable communication method.

EPG information may be received through EPG signals entering the display 12 via cable 20. EPG information may be transmitted in a variety of ways. For example, the EPG information may be contained in the vertical blanking interval of the public broadcasting channel, or it may be broadcast separately on its own channel as in a cable system or satellite broadcast system. Alternatively, EPG information may be transmitted separately from the video signal, such as over the Internet or a telephone line.

Figure 2:
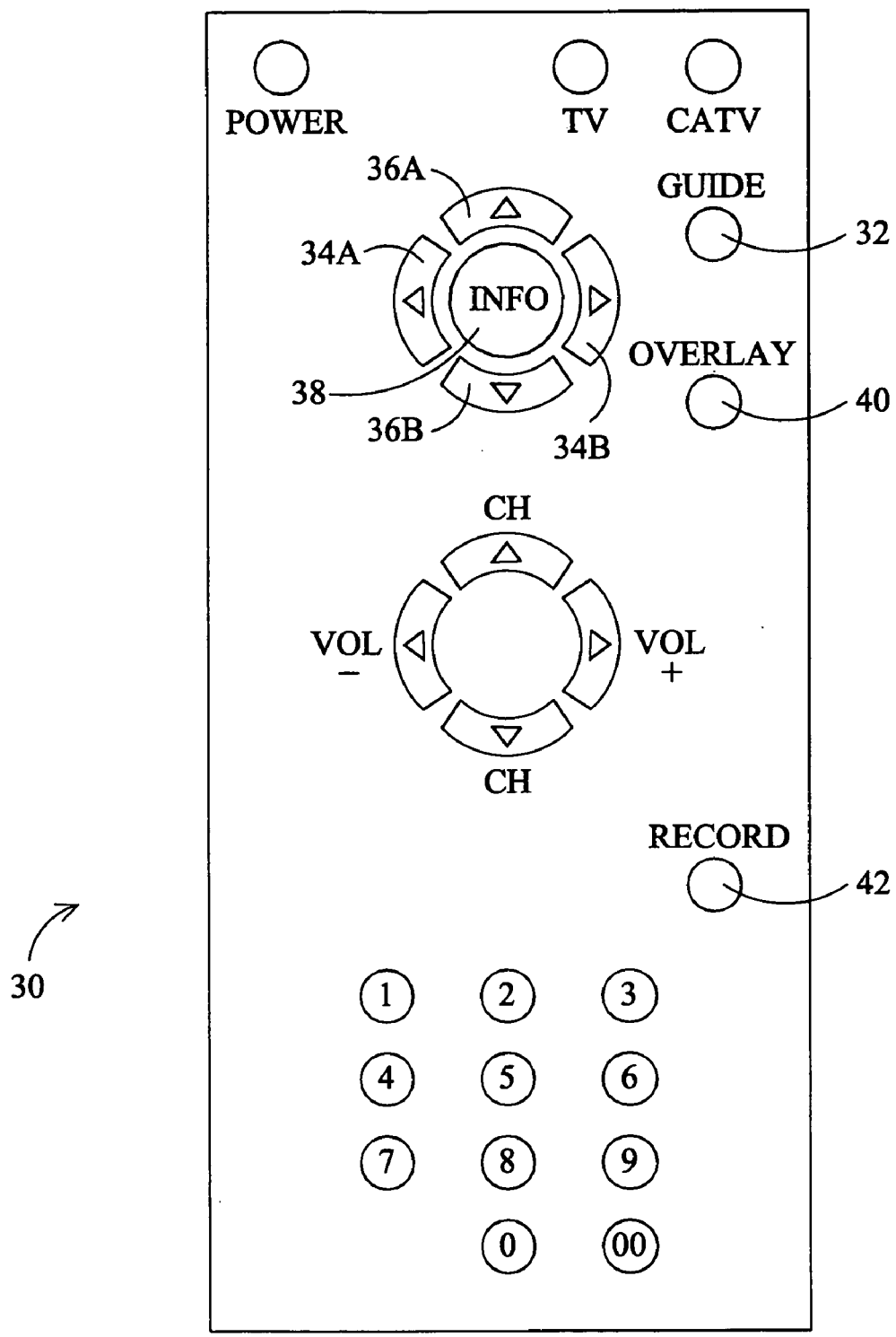
FIG. 2 shows an exemplary user interface of the present invention.

In system 10, the user interface 30 controls the display 12. Referring now to FIG. 2, user interface 30 has a number of buttons to control such functions as power, the channel selected, volume, etc. By pressing certain buttons on the user interface 30, the user may control the display of certain EPG information. Guide button 32 allows the user to display a panel which contains an EPG grid 90 on a portion of screen 16. Cursor control buttons 34a,b and 36a,b control movement of a cursor through the EPG grid 90. Information banner button 38 allows the user to display a panel which contains an information banner 100. (Overlay button 40 allows an information banner 100 to be displayed simultaneously with the EPG grid 90.)

Figure 3:
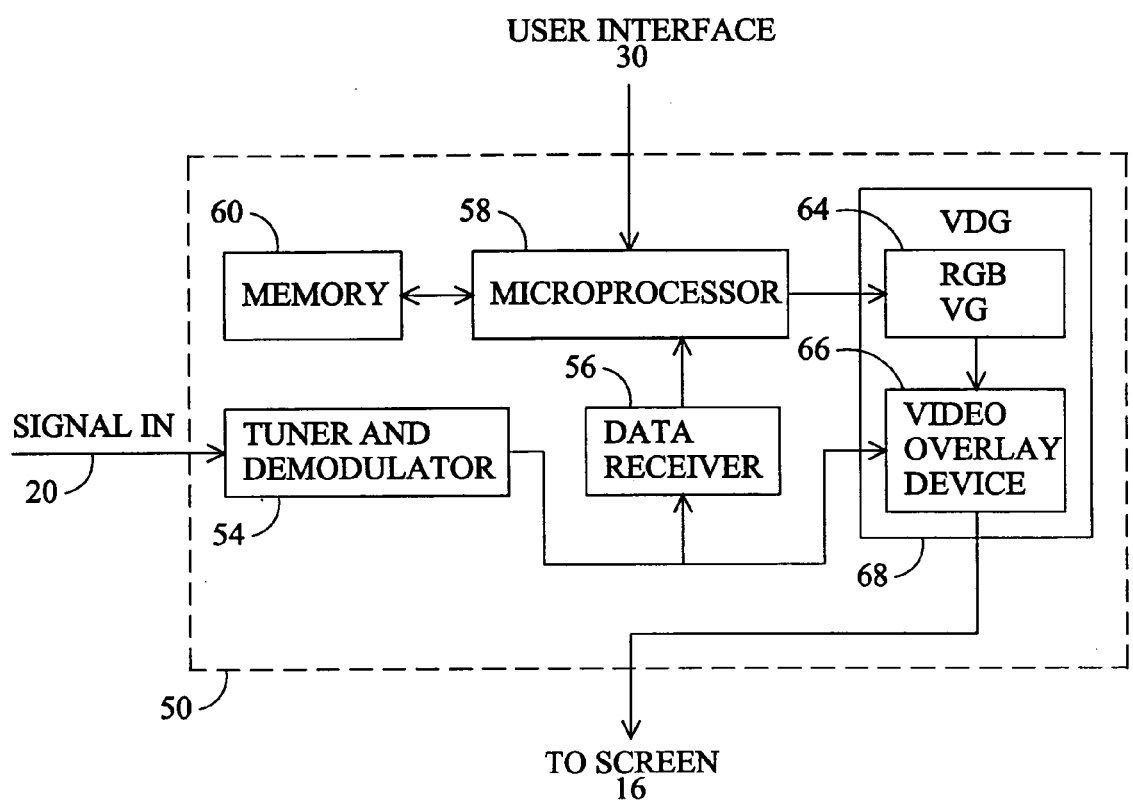
FIG. 3 shows a block diagram of an exemplary circuit for the display.

FIG. 3 is a block diagram of an exemplary circuit 50 for displaying EPG information on the display 12 simultaneously with the video. The incoming signal containing both the video and EPG information is received from cable 20 by the tuner and demodulator 54. The EPG information is extracted from the incoming signal with the data receiver 56. Microprocessor 58 selects the appropriate EPG information to display based on user input signals received from the user interface 30. Software within microprocessor 58 determines initial EPG settings based on time of day and current viewing settings. The circuit 50 has an optional memory 60 for storing EPG information to allow faster retrieval of EPG information in response to user inputs from the user interface 30. The microprocessor issues control commands to video display generator (VDG) 68 based on user inputs. The VDG includes a standard red-blue-green (RBG) video generator 64, which takes the digital program schedule information sent by microprocessor 58 and converts it to an RBG format in accordance with a bit map for the screen display. VDG 68 includes a video overlay device 66, which accepts the RBG video input, as well as the video signal from the tuner/demodulator 54. The overlay device 66 converts and combines the RGB signal with the signal from the tuned demodulator, and produces a composite output signal containing both the original video signal from the cable 20 and the EPG information. The composite video signal is then supplied to the screen 16 of display 12.

The EPG information received through cable 20 contains information relating to particular programs for different channels and different times. The EPG information may, for example, provide programming information for each channel on a cable system and for a time period ranging from several hours to several weeks. Typically, the broadcast EPG signals contain EPG information for the next 12 to 24 hours. The information relating to a particular program is referred to herein as a "record." Each record contains at least the channel on which the program will be shown and information relating to when the program will be shown. The record may also contain other information, such as the title of the program, a description of the program, the names of actors in the program, rating guides, whether the program is close-captioned, and whether the program is a repeat. Each record has an associated time range corresponding to the time during which the program will be shown. Thus, the associated time range for a particular record is the time range between and including the beginning and the ending time of the program. Alternatively, the time range for a program may be composed of several shorter time ranges that together span the time range of the program.

Figure 5:
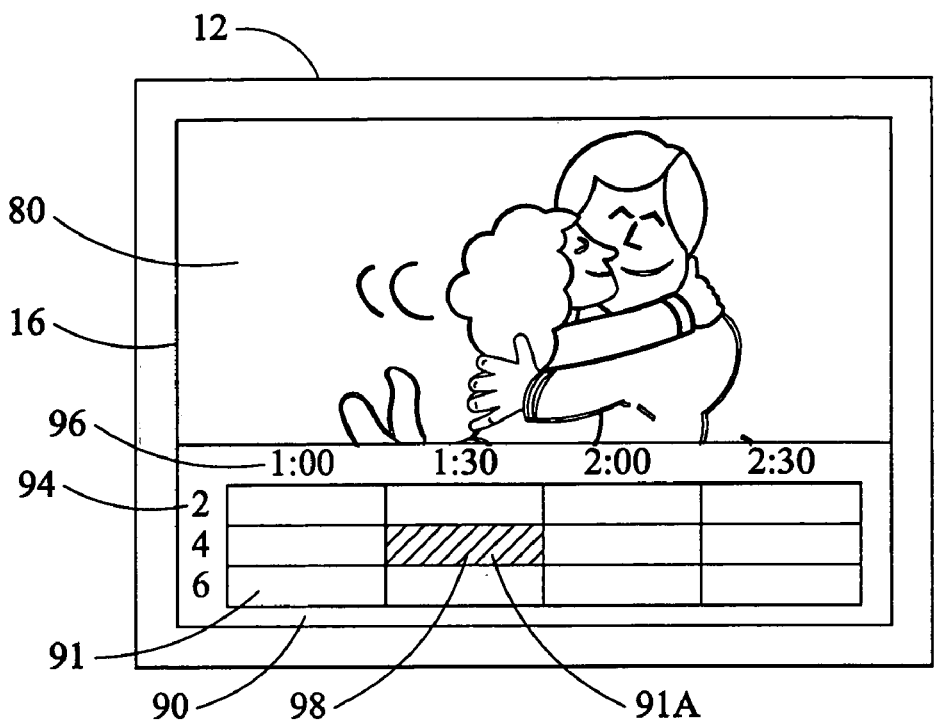
FIG. 5 shows an exemplary display displaying a video and an EPG grid.

In the present invention, a user may view EPG information in a variety of ways. When a user is viewing a video 80, the user may display the EPG grid 90 by pressing the guide button 32 of user interface 30. The user interface 30 sends a signal to the display 12, and in response the display 12 displays the EPG grid 90 on a portion of the screen 16. The remaining portion of the screen 16 continues to display the video 80. The display 12 may either reformat video 80 to continue to show all of the video 80 on the remaining portion of screen 16, or may overlay the EPG grid 90 on the video 80 so that a portion of the video 80 is blocked. FIG. 5 shows an exemplary display 12 after the guide button 32 has been depressed.

Figure 5A:
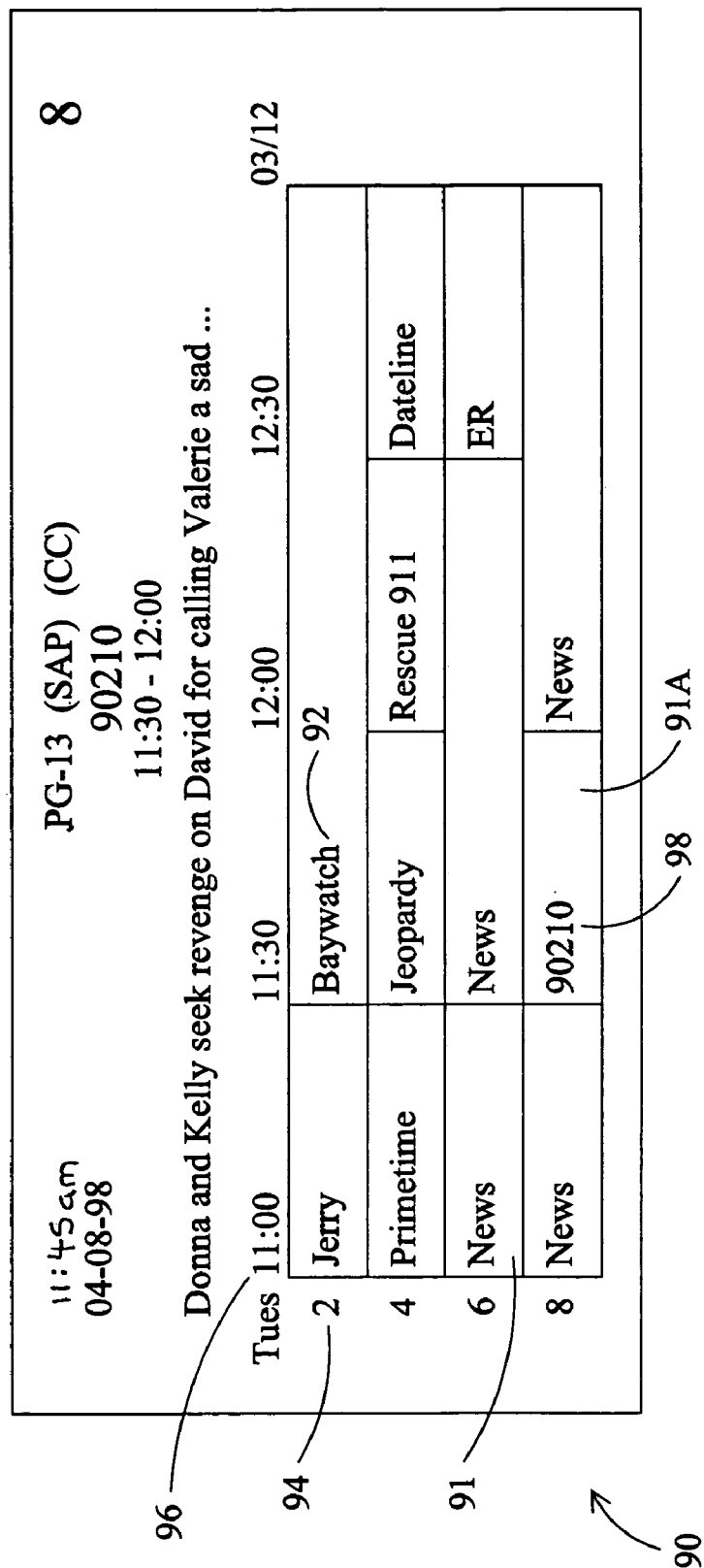
FIG. 5A shows an exemplary EPG grid.

FIG. 5A shows the EPG grid 90 of FIG. 5 in more detail. The EPG grid 90 is comprised of a plurality of cells 91, each corresponding to a particular record. The cells 91 are arranged in rows and columns, with the rows corresponding to the various channels and the columns corresponding to different times. As can be seen, a particular cell may extend across several time columns. Each cell 91 may display, for example, the program title 92. Channel information 94 may be displayed adjacent to the row containing cells corresponding to that channel, and times 96 are displayed above the cells. When the EPG grid 90 is initially displayed, a cursor 98 is displayed in the cell 91*a* which corresponds to the initial program, or initial record, currently displayed as the video 80 on the screen 16. The cursor 98 may take any form which indicates the presence of the cursor in the record, such as highlighting cell 91*a*, displaying cell 91*a* in a different color, adding an additional character to cell 91*a*, or any other distinguishing feature. Information may also be displayed in alternative formats, with other programming information included on the grid or in the cells.

To view different programming information, the user navigates the EPG grid 90 with the cursor control buttons 34*a* and 34*b* and 36*a* and 36*b*. The cursor control buttons 34*a* and *b* and 36*a* and *b* move the cursor 98 throughout the EPG grid 90. Cursor control buttons 34*a* and *b* move the cursor 98 horizontally to the left and right from cell to cell along a particular row, while cursor control buttons 36*a* and *b* move the cursor vertically from cell to cell along a column corresponding to the associated time range of the initial record.

The present invention achieves its advantages by allowing a user to select with the user interface 30 records which are not currently displayed, and then displaying a new EPG grid 90*a* which contains the new selected record. The initial EPG grid 90 has an associated time range corresponding to the time ranges of the cells displayed in the EPG grid 90. For example, referring to FIG. 5, the associated time range of the EPG grid 90 would be 1 p.m. to 3 p.m., corresponding to the time intervals of the cells displayed on the EPG grid. The initial EPG grid 90 also has an associated range of channels corresponding to the rows of channels displayed on the EPG grid 90.

The cursor control buttons 34*a, b* may be used to select a new record which is not displayed on the current EPG grid 90. This allows the user to select program information for a program, or record, that is at a time that is different from the associated time range of the initial EPG grid 90. For example, the cursor control button 34*b* may be used to select a cell in the initial EPG grid 90 which is along the right margin of the EPG grid 90. The user could then press the cursor control button 34*b* again, which would select a new record. The new record selected is the record for the next program on the same channel. For example, referring to FIG. 5A, if the cursor occupied the cell corresponding to the program "ER," by pushing the cursor control button 34*b* the user would select a new record corresponding to the program which follows ER on channel 6.

Figure 6:
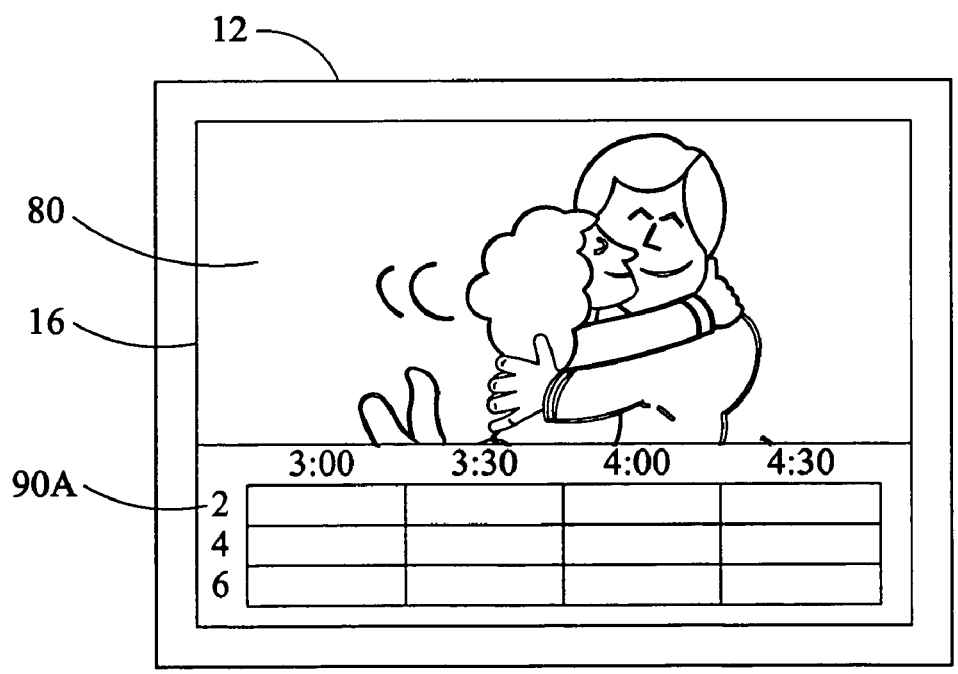
FIG. 6 shows another exemplary display displaying a video and an EPG grid.

When such a new record is selected, a new EPG grid 90*a* is displayed as shown, for example, in FIG. 6. The new EPG grid 90*a* includes the new record which has been selected, together with other programming information for other times and other channels. The new grid 90*a* also has an associated time range, which corresponds to the time ranges of the newly displayed cells. Thus, the new grid 90*a* has an associated time range that is different than the initial grid 90. The associated range of channels of the initial EPG grid 90 is the same as the associated range of channels of the new EPG grid 90*a*. In addition, the screen 16 continues to display the video 80 while simultaneously displaying the new grid 90*a*. Thus, the user may enjoy uninterrupted viewing of the video 80 while scrolling through the EPG grid horizontally among different times to view different programming information, and displaying new EPG grids for time periods that are earlier or later than the associated time range of the initially displayed EPG grid.

Figure 7:
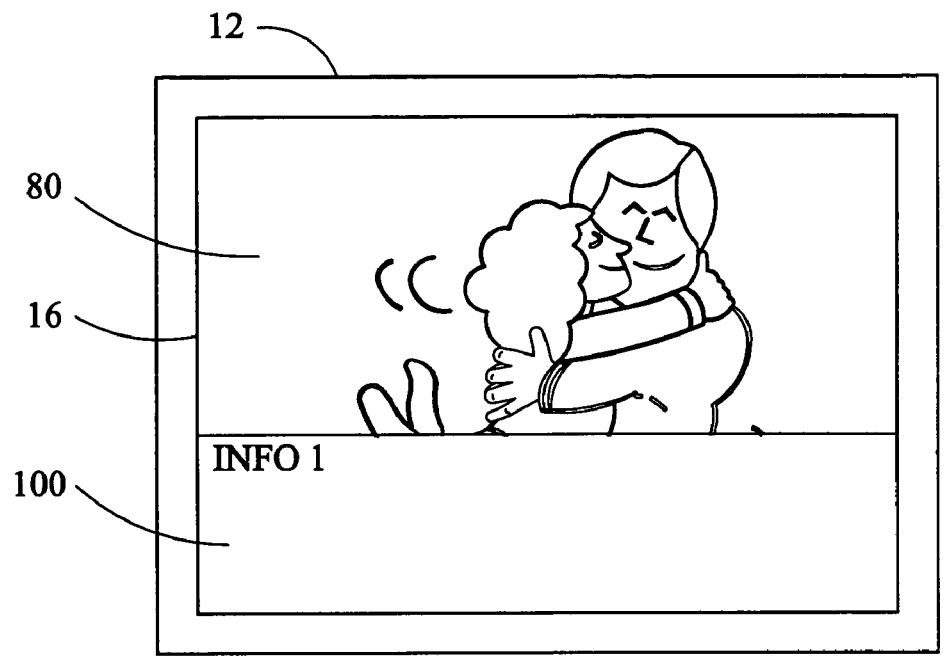
FIG. 7 shows an exemplary display displaying a video and an information banner.

In another embodiment of the invention, a user may view different information banners for different times while continuing uninterrupted viewing of a video. When the information banner button 38 is pushed, the user interface 30 sends a signal to the display 12, which in response displays an information banner 100 on a portion of the screen 16. An exemplary screen display is shown in FIG. 7, showing the video 80 and information banner 100. FIG. 7A shows an exemplary information banner 100 in more detail. The information banner 100 contains, for example, the title of the program, the start and ending time for the program, a description of the program, the channel information, rating information, whether the program is close-captioned, and whether the program is a repeat. Like an EPG grid, the information banner 100 also has an associated time range. This time range corresponds to the beginning and ending time of the program, or record. The associated range of channels for the information banner correspond to the channel of the record or program.

Figure 8:
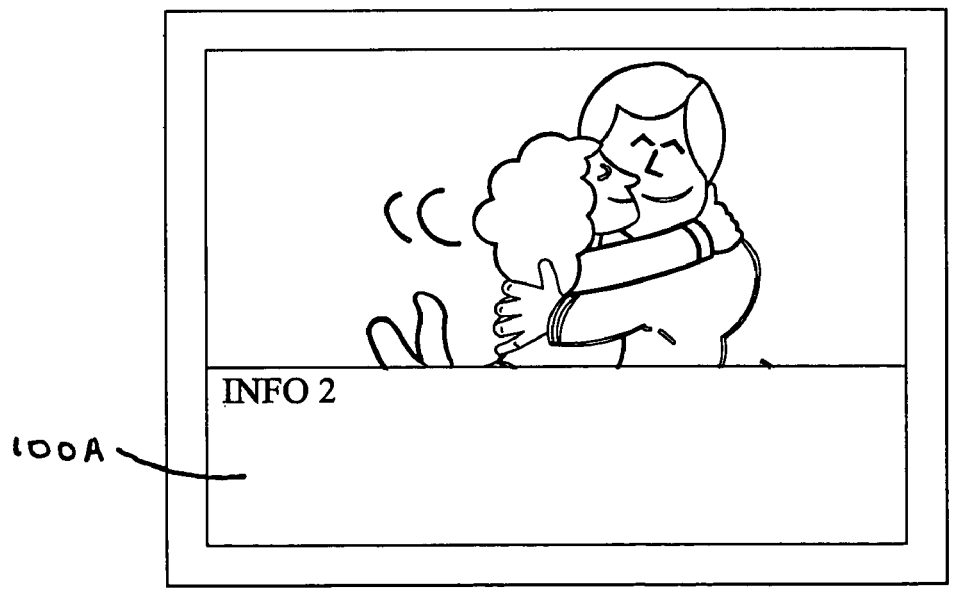
FIG. 8 shows another exemplary display displaying a video and another information banner.

The user interface 30 may be used to select a different information banner 10*a* that has an associated time range that is different than the associated time range of the initially displayed information banner 100. By pressing the cursor control buttons 34*a, b*, the user selects a new record which corresponds to the same channel but next program in time. When the new record is selected, a new information banner 100*a* is displayed containing the information corresponding to the new record. FIG. 8 shows the results, for example, of selecting a new record having an associated time range that is different than the associated time range of the initial information banner 100. A new information banner 100*a* is displayed corresponding to the newly selected record while the video 80 is continued to be displayed on another portion of the screen 16.

The cursor control buttons 34*a* and *b* and 36*a* and *b* may be used therefore to navigate among different information banners in the same manner as the cursor control buttons are used to move the cursor to different records in an EPG grid. Thus, just as pressing cursor control buttons 36*a* and *b* will move a cursor vertically through an EPG grid to cells in adjacent rows corresponding to different channels, so too when an information banner is displayed, the cursor control buttons 36*a* and *b* will display different information banners for different channels but having the same or an overlapping associated time range. Pressing cursor control buttons 34*a* and *b* will display information banners for programs on the same channel but having different associated time ranges which are either earlier or later than the displayed information banner. In essence, the system acts as if the user is navigating a virtual EPG grid using the cursor control buttons 34*a* and *b* and 36*a* and *b*. However, instead of displaying the EPG grid, the screen 16 displays the information banner corresponding to the cell the cursor would occupy in the EPG grid.

Alternatively, other buttons on a user interface may be used to select new records. Thus, different records may be selected by using a numeric keypad, or other control buttons may be provided to allow new records to be selected.

In another aspect of the invention, the system allows the user to first display an EPG grid and then to display an information banner for a new record. In such an embodiment, a user would first display the EPG grid 90 by pressing the EPG guide button 32. The cursor would occupy the cell corresponding to the record of the video being displayed. Thus, the user would view a display as in FIG. 5. Using the cursor control buttons 34*a* and *b*, or other numeric keypads, the user may select a new record. The user may then press the information banner button 38. The system would then display an information banner 100, such as shown in FIG. 7, corresponding to the new record. The information banner 100 for the new record would have an associated time range corresponding to the new record. Since most records would have associated time ranges that are different than the associated time range of the initially displayed EPG grid 90, the information banner 100 would likely have an associated time range that is different than the associated time range of the initially displayed EPG grid 90.

Similarly, a user could initially display an information banner 100, and then display an EPG grid 90 containing the record corresponding to the initially displayed information banner, while continuing to display the video 80. In other words, the user would initially select a display as shown in FIG. 7 by pressing button 38, and then select a display corresponding to FIG. 5 by pressing button 32.

Figure 4A:
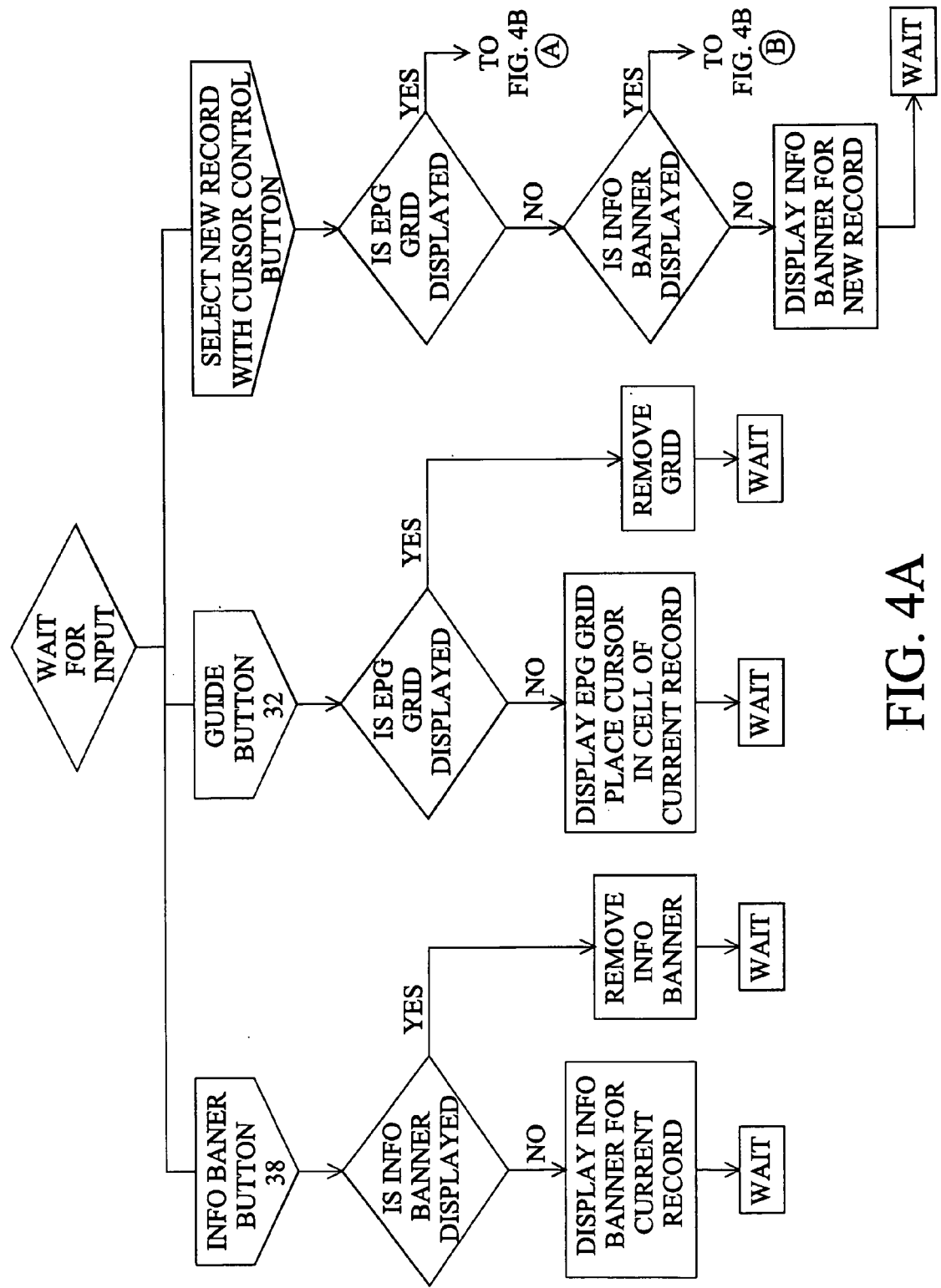
FIGS. 4A and 4B shows a flow diagram of an exemplary method of the present invention.
Figure 4B:
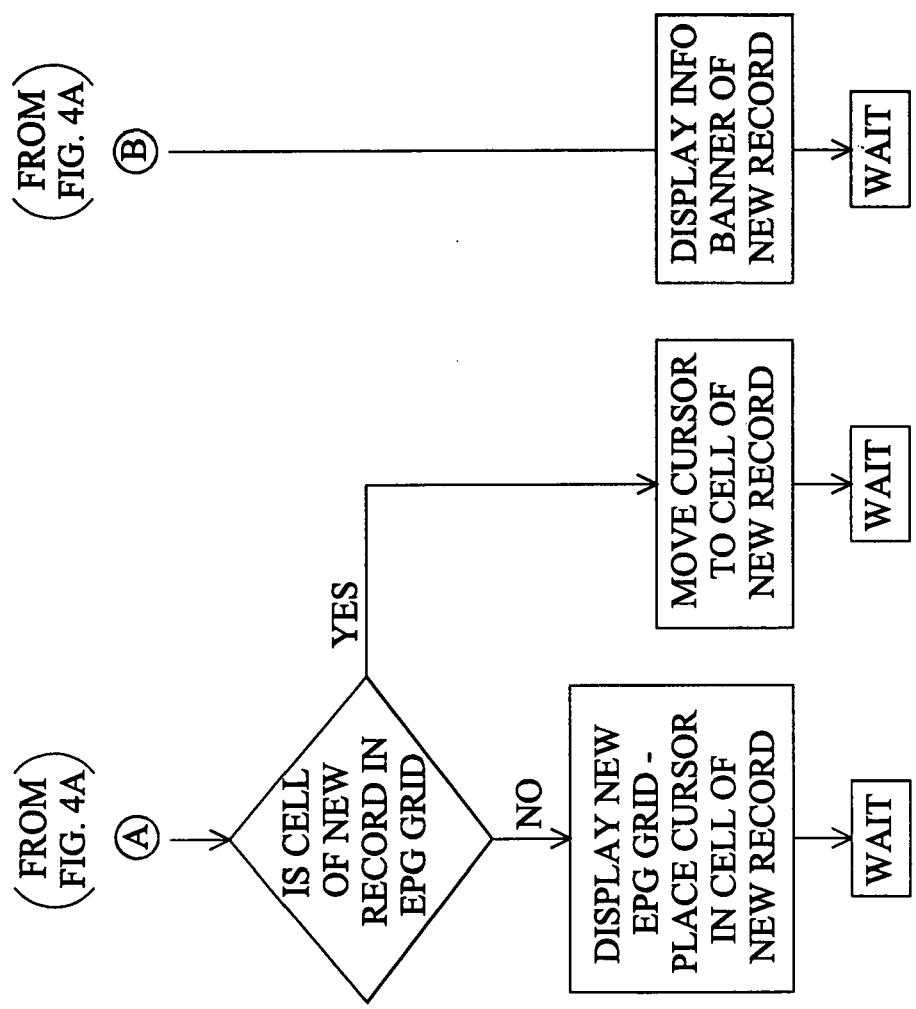

FIGS. 4A and 4B are flowcharts of an exemplary method of the present invention. FIGS. 4A and 4B illustrate the various aspects of the invention which allow new records to be selected which have associated time ranges that are different than the currently displayed EPG grid or information banner. In addition, FIGS. 4A and 4B illustrate one exemplary method for removing the EPG grid or information banner from the screen when it is no longer desired to view programming information.

Figure 9:
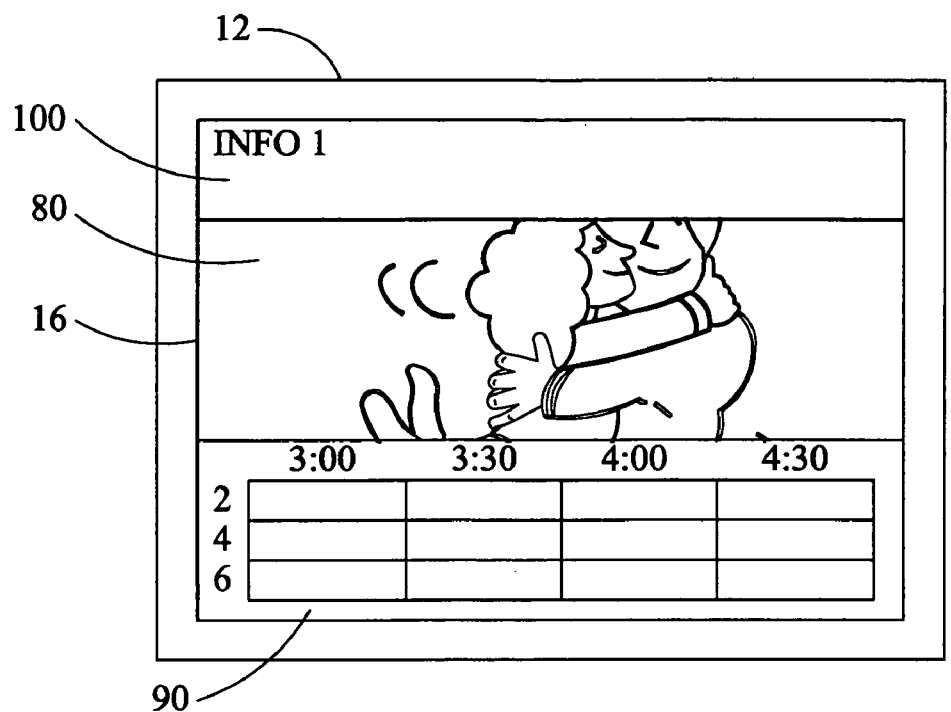
FIG. 9 shows an alternative embodiment of a display.
Figure 10:
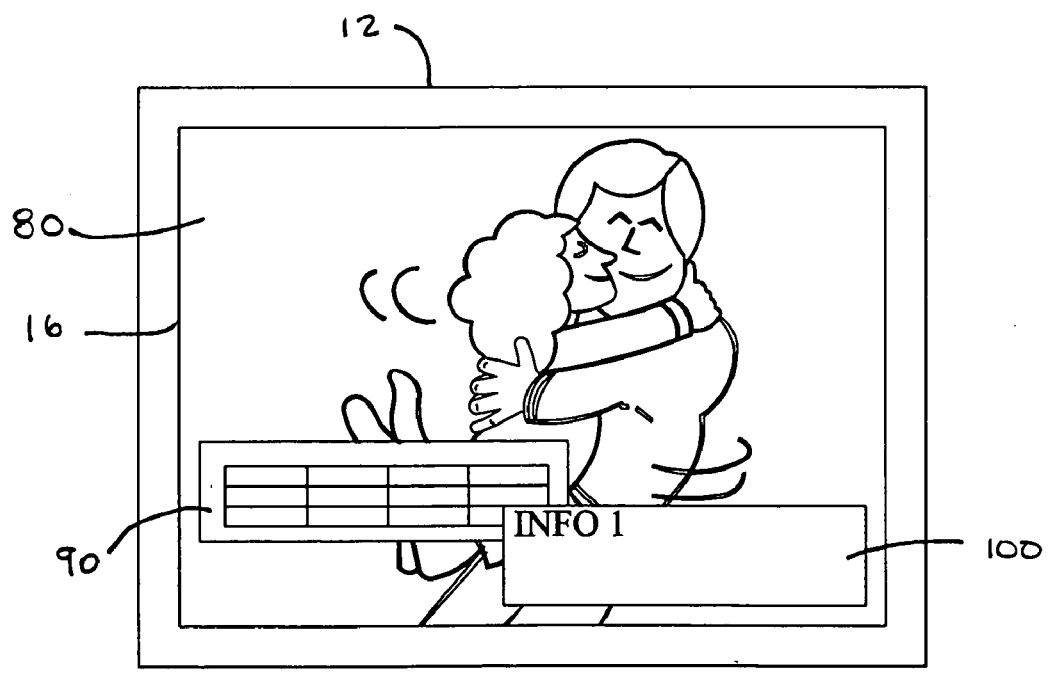
FIG. 10 shows another alternative embodiment of a display.

In another aspect of the invention, an EPG grid and information banner may be displayed simultaneously with a video. FIG. 9 shows, for example, one embodiment of such a display in which an information banner 100 is displayed above a portion of the video 80, while the EPG grid 90 is displayed beneath the video 80. FIG. 10 shows an alternative arrangement in which the EPG grid 90 is partially blocked by an information banner 100, both of which are superimposed over a portion of the video 80. In such embodiments, a user could initially select an EPG grid 90 and corresponding information banner 100, and then select a new record and display a new information banner 100*a* simultaneously with the EPG grid 90, as, for example, beginning with the display such as shown in FIG. 5 and ending with the display as shown in FIG. 9 or FIG. 10. Such a display may be selected by pushing an overlay button 40 on user interface 30. In such an embodiment, both the EPG grid and information banners may be updated as described above.

The present invention finds utility alone in a display, and used in conjunction with other devices. Thus, the present invention could be used to control the settings for a video recorder, either analog or digital. A user could scroll through either EPG grids or information banners to display the record corresponding to the program which is desired to be recorded. A user may either navigate the cursor to the desired cell, or display the information banner of the desired program. Pressing a record button 42 on user interface 30 would then instruct the video recorder to record the desired program. Thus, the present invention would allow convenient programming of a video recorder while allowing uninterrupted viewing of a video.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method for displaying programming information, comprising:

(a) displaying a video comprising a plurality of frames on a portion of a display;

(b) displaying a first panel in response to a first signal from a user interface, said first panel being displayed on another portion of said display simultaneously with said video, said first panel containing information from at least one of a plurality of records, said records containing programming information, each of said records having an associated time and an associated channel, and said first panel displaying on said display an associated range of channels; a first time, where said first time is the earliest time displayed on said display in response to said first signal; and a second time, said second time being a later time displayed on said display in response to said first signal and a time incrementally earlier than an end of a time range associated with said first panel;

(c) selecting a first record in response to a second signal from said user interface;

(d) selecting a second record in response to a third signal from said user interface, where said second record has an associated time and an associated channel, where said associated time of said second record is one of a time later than said second time and a time earlier than said first time; and (e) in response to selecting said second record, displaying simultaneously with said video a second panel, said second panel having an associated range of channels that is the same as the associated range of channels of said first panel and an associated time range extending from a third time to a time incrementally later than a fourth time, said third and said fourth times both being times that are, respectively, one of times later than said second time and times earlier than said first time and where neither of said third and said fourth times were displayed on said first panel.

2. The method of claim 1 wherein said associated time range from said first time to said time incrementally later than said second time encompasses the entire said first panel, and said associated time range from said third time to said time incrementally later than said fourth time encompasses the entire said second panel.

3. The method of claim 1 wherein said first and second panels are EPG grids, each EPG grid containing a plurality of cells, and said cells containing information from said records.

4. The method of claim 1 wherein said first panel is removed from said display before said second panel is displayed.

5. The method of claim 1, further comprising the step of displaying at least one of another information banner and another EPG grid.

6. The method of claim 1 wherein said display is a digital television.

7. The method of claim 1 wherein said records are digitally transmitted with said video.

8. The method of claim 1 wherein said user interface is a remote control for a television.

9. The method of claim 1 wherein each of said first and second panels comprise a minor portion of said display.

10. The method of claim 1, further comprising the step of programming a video recorder to record said selected record.

11. A method for displaying programming information, comprising:
   (a) displaying a video comprising a plurality of frames on a first portion of a display;
   (b) displaying a first panel on a second portion of said display in response to a first signal from a user interface, said first panel being displayed simultaneously with said video, said first panel containing information from at least one of a plurality of records, said records containing programming information, each of said records having an associated time and an associated channel, and said first panel displaying on said display an associated range of at least one channel; a first time, where said first time is the earliest time displayed on said display in response to said first signal; and a second time, said second time being a later time displayed on said display in response to said first signal and a time incrementally earlier than an end of a time range associated with said first panel;
   (c) selecting a first record in response to a second signal from said user interface;
   (d) selecting a second record in response to a third signal from said user interface, where said second record has an associated time and an associated channel, where said associated time of said second record is one of a time later than said second time and a time earlier than said first time; and
   (e) in response to selecting said second record, displaying simultaneously with said video a second panel, said second panel having an associated range of channels that is the same as the associated range of channels of said first panel and an associated time range extending from a third time to a time incrementally later than a fourth time, said third and said fourth times both being times that are, respectively, one of times later than said second time and times earlier than said first time and where neither of said third and said fourth times were displayed on said first panel.

\* \* \* \* \*

UNITED STATES PATENT AND TRADEMARK OFFICE
CERTIFICATE OF CORRECTION

PATENT NO. : 6,971,118 B1
DATED : November 29, 2005
INVENTOR(S) : Mojgan J. Akhavan et al.

It is certified that error appears in the above-identified patent and that said Letters Patent is hereby corrected as shown below:

Column 6,
Line 49, change "10$a$" to -- 100$a$ --.

Signed and Sealed this

Twenty-third Day of May, 2006

JON W. DUDAS
*Director of the United States Patent and Trademark Office*